(12) United States Patent
Hirsch et al.

(10) Patent No.: US 11,831,261 B2
(45) Date of Patent: Nov. 28, 2023

(54) METHOD AND DEVICE FOR CALIBRATING A CONTROLLER OF AN ELECTRIC MACHINE

(71) Applicant: Robert Bosch GmbH, Stuttgart (DE)

(72) Inventors: Michele Hirsch, Esslingen (DE); Sebastian Paulus, Esslingen am Neckar (DE); Wei-Lung Lee, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/780,408

(22) PCT Filed: Oct. 21, 2020

(86) PCT No.: PCT/EP2020/079582
§ 371 (c)(1),
(2) Date: May 26, 2022

(87) PCT Pub. No.: WO2021/104760
PCT Pub. Date: Jun. 3, 2021

(65) Prior Publication Data
US 2023/0006589 A1    Jan. 5, 2023

(30) Foreign Application Priority Data
Nov. 29, 2019  (DE) .................. 10 2019 218 533.9

(51) Int. Cl.
*G05B 5/00*  (2006.01)
*H02P 23/04*  (2006.01)
*H02P 23/14*  (2006.01)

(52) U.S. Cl.
CPC .............. *H02P 23/04* (2013.01); *H02P 23/14* (2013.01)

(58) Field of Classification Search
CPC ........... H02P 23/04; H02P 23/14; H02P 21/05
See application file for complete search history.

(56) References Cited

FOREIGN PATENT DOCUMENTS

| CN | 108696219 A | 10/2018 |
|---|---|---|
| DE | 102011011941 A1 | 12/2011 |

(Continued)

OTHER PUBLICATIONS

Translation of International Search Report for Application No. PCT/EP2020/079582 dated Jan. 12, 2021 (2 pages).

*Primary Examiner* — Karen Masih
(74) *Attorney, Agent, or Firm* — Michael Best & Friedrich LLP

(57) ABSTRACT

The invention relates to a method (400) for calibrating a controller of an electric machine (120). The method comprises the following steps: specifying (410) a first signal (S_1) for generating a sinusoidal phase current for energising a winding of an electric machine (120); superposing (420) the first signal (S_1) with a test signal (S_Test_i) in order to generate a harmonic oscillation with a predetermined excitation amplitude and/or phase position relative to the phase current, which harmonic oscillation superposes the phase current; detecting (430) a response signal (S_Antw_i), resulting from the superposition of the phase current and the harmonic oscillation, by means of a sensor (130); determining (450) a calibrated signal (S_kal) for generating a harmonic oscillation with a predetermined excitation amplitude and a phase position relative to the phase current on the basis of a determined minimum of a response plane (A_Antw); operating (460) the controller (110) of the electric machine (120) on the basis of the determined minimum.

7 Claims, 4 Drawing Sheets

(56) References Cited

FOREIGN PATENT DOCUMENTS

| | | |
|---|---|---|
| DE | 102017208769 A1 | 11/2018 |
| WO | WO-2017133824 A1 * | 8/2017 ............. H02P 21/18 |
| WO | 2019242733 A1 | 12/2019 |

* cited by examiner

METHOD AND DEVICE FOR CALIBRATING A CONTROLLER OF AN ELECTRIC MACHINE

BACKGROUND OF THE INVENTION

The invention relates to a method and a device for calibrating a controller of an electric machine. Furthermore, the invention relates to an electrical drive system having a corresponding device and a vehicle having an electrical drive system as well as a computer program and a computer-readable storage medium.

Electrical rotary field machines, in particular permanent excitation synchronous machines (PSM) having trenched magnets, are activated to generate a desired torque by means of a suitable combination of direct torque and reluctance torque. In field-oriented control, the direct torque and the reluctance torque are selected by means of corresponding selection of the d-current and q-current operating points (id, iq) in the rotor-fixed coordinate system. In addition to emitting a uniform average torque, the electric machines also generate harmonic overtones of the torque during operation, which form, for example, due to non-ideal sinusoidal magnetic fields, turn arrangements, grooves, tooth shape, saturation effects, and/or other effects.

Such effects result in force waves between rotor and stator, which act in characteristic orders as tangential and radial tooth forces on the stator teeth, and from there are perceivable due to the mechanical transmission behavior of the electric machine as oscillations in the machine, the machine housing, and coupled-on elements and thus as structure-borne and airborne sound or surface oscillations. Such oscillations can be reduced or amplified with the aid of additional deliberately applied current harmonics, having matching orders, to the actual specified phase current. Reading out parameters for these current harmonics to be applied, for example, from a characteristic map as a function of, for example, the torque to be set or an operating point and superimposing corresponding current harmonics during the operation of the electric machine with the actual phase current is known. If a sufficiently accurate modeled description of the relevant effects of the electric machine is not available, for example, due to exemplar tolerances, etc., from which the parameters can be ascertained by simulation, the parameters have to be determined in another way. A large amount of application or calibration effort on the test bench is necessary to determine the parameters for these current harmonics. For this purpose, preferably, for example, surface accelerations/velocities, sound emission in the surroundings of the electric machine, or torque ripples or oscillations of the torque are preferably ascertained. By means of suitable measurement signals, to determine the parameters of the current harmonics to be applied, for example, preferably a minimum for a single variable system or an optimum for a multivariable system having competing goals is iteratively ascertained. If a torque sensor is available in the drive, a calibration is also possible on the basis of this sensor signal, wherein the sensitivity of the sensor has to be correspondingly high to have the torque ripple, which is low in comparison to the useful torque, accessible metrologically. A torque sensor is costly and is therefore not provided as a standard feature in many applications.

There is therefore a need for alternative methods and devices for calibrating a controller of an electric machine.

SUMMARY OF THE INVENTION

A method is provided for calibrating a controller of an electric machine, having the following steps:

Specifying a first signal to generate a sinusoidal phase current to energize at least one winding of an electric machine.

Superimposing the first signal with a test signal to generate at least one harmonic oscillation having a predetermined excitation amplitude and/or phase position relative to the phase current, which is superimposed on the phase current.

Detecting a response signal resulting from the superposition of the phase current and the harmonic oscillation, in particular its response amplitude, by means of a sensor.

Repeating the two preceding steps "superimposing" and "detecting" multiple times using different test signals to generate further harmonic oscillations having specifiable excitation amplitudes and/or phase positions relative to the phase current, which are superimposed on the phase current.

Ascertaining a minimum of a response area, which results as a function of the resulting response signals of the harmonic oscillations generated by means of the test signals over a preferably specifiable excitation amplitude range and phase position range.

Determining a calibrated signal to generate a harmonic oscillation at a predetermined excitation amplitude and a phase position relative to the phase current as a function of the ascertained minimum, for which preferably a response signal having minimal response amplitude results.

Operating the controller of the electric machine; wherein the first signal is specified to generate a sinusoidal phase current to energize a winding of the electric machine and the determined calibrated signal is superimposed to generate the harmonic oscillation.

The operation of electric machines by means of field-oriented controllers is known. The alternating variables of the phase currents are each transferred into a coordinate system rotating at the frequency of the alternating variables. Zero-frequency variables, to which all typical methods of control technology can be applied, then results within the rotating coordinate system in stationary operation of the electric machine from the alternating variables. Due to the multiphase phase-offset alternating currents applied to the stator, a rotating magnetic field results during operation of the electric machine, preferably described as a rotating chained magnetic flux in the stator-fixed coordinate system or as a chronologically constant chained flux in the rotating rotor-fixed (d/q) coordinate system or field-oriented system.

The controller of the electrical machine specifies, preferably as a function of a specifiable torque value, a signal to generate a sinusoidal phase current. The sinusoidal phase current preferably flows through the stator and thus corresponds to the stator current. Within the rotating coordinate system, the d/q coordinate system or field-oriented system, which rotates synchronously with the rotor flux, or permanent magnet flux in a PSM, and the d axis of which points in the direction of the rotor flux, a stator current is represented as a stator current pointer or stator current vector, which is characterized via its length and its direction. This current pointer rotates synchronously with the rotating stator flux or rotor flux of the electric machine. In the d/q coordinate system, the current pointer can be represented in accordance with its length and its direction by means of two components Id and Iq perpendicular to one another, which are zero-frequency variables in the stationary case. A test signal is superimposed on the first signal for generating the sinusoidal phase current to generate a harmonic oscillation having a predetermined amplitude and/or phase position relative to the sinusoidal phase current, which is superimposed on the sinusoidal phase current. The predetermined amplitude thus generated is called the excitation amplitude. The harmonic oscillation is preferably a harmonic overtone of a specified order relative to the sinusoidal phase current, which is superimposed on the sinusoidal phase current. This superposition results in a changed oscillation of the emitted torque and/or the forces acting between rotor and stator of a connected electric machine. This oscillation in the torque or the forces results, due to the mechanical coupling of the electric machine with the housing, in a mechanical and/or acoustic oscillation of the housing and components connected thereto. The overall transmission path leads from a superimposed harmonic current oscillation via oscillations in electromagnetic forces and torques to a mechanical oscillation or noise excitation of a connected electric machine and/or the power electronics unit, which is measurable using a suitable sensor, for example acoustically. This oscillation resulting from the superposition of the phase current and the harmonic oscillation is detected as a response signal by means of a sensor. Preferably, a harmonic oscillation of the torque is detected as the response signal.

This superposition is repeated multiple times, preferably at least three times, using different, preferably specified test signals to generate further harmonic oscillations having specifiable excitation amplitudes and/or phase positions relative to the phase current. A first test signal S_Test_1 is preferably specified to generate a harmonic oscillation having a predetermined excitation amplitude S_Test_1_A=0 and an arbitrary phase position relative to the phase current. Furthermore, preferably three further test signals S_Test_2, S_Test_3, S_Test_4 are specified to generate a harmonic oscillation having a common fixed predetermined excitation amplitude S_Test_2, 3, 4_A>0 and uniform phase position distributed over 360° relative to the phase current, e.g., 0, 120°, 240° or 60°, 180°, 300°. By means of the corresponding at least four different detected response signals, a characteristic, unique, multiple curved response area results. To generate further support points of the response area, preferably further test signals can be specified to generate further harmonic oscillations having specifiable and/or different excitation amplitudes and/or phase positions relative to the phase current. As shown in FIG. 3, the response area resulting from the response signals, in particular its amplitudes or response amplitudes, has a characteristic shape/topology upon the observation over various excitation amplitudes of the test signals and their phase positions. The response area preferably extends over the phase positions 0 to 360° and the excitation amplitudes of the test signals in negative and/or positive dimension. The response area contains, in a representation over the phase positions 0 to 360° and the positive and negative excitation amplitudes, two minima, once in the region of the excitation amplitude>0 and once in the region of the excitation amplitudes<0 of the harmonic oscillations generated by means of the test signals. The first minimum is characterized via a first minimum phase position and a positive first minimum amplitude. The second minimum is characterized via a second minimum phase position and a negative second minimum amplitude. The first minimum phase position is shifted 180° in relation to the second minimum phase position.

A superposition of the first signal with a second signal, preferably a test signal or a calibrated signal, to generate a harmonic oscillation having a predetermined excitation amplitude and a phase position, relative to the phase current, which correspond to an excitation amplitude and a phase position of an ascertained minimum, thus having a first or second minimum phase position and a corresponding first or second minimum amplitude, causes minimization of the mechanical oscillations or noise excitations generated on the part of a connected drive system, comprising a connected electric machine, power electronics unit, and/or drivetrain.

The topology of the response area maintains its characteristic independently of whether the unknown harmonic oscillation is directly taken into consideration or the effect on a measurable variable is observed after the action of a linear or approximately linear transmission path.

In addition to other mathematical methods for ascertaining the location of the minima of such a response area as a function of ascertained response signals, preferably the following procedure is used:

The curve of the response amplitudes of the resulting response signals as a function of test signals to generate harmonic oscillations having a common fixed predetermined excitation amplitude>>0 varies for the range having excitation amplitudes>0 sinusoidally over its phase position relative to the phase current.

The characteristic of the response area results, for the range having excitation amplitudes<0 for the curve of the response amplitudes of the resulting response signals as a function of test signals for generating harmonic oscillations having the inverted or negative common fixed predetermined excitation amplitude, in a sinusoidal curve having 180° phase shift over its phase position relative to the phase current. The location of the high and low points of these curves correspond here to the location of the two minima of the response area with respect to the phase position relative to the phase current. A further property of the response area is that the (positive) gradient of the response area in negative and positive direction is approximately constant along increasing absolute values of the excitation amplitudes of the harmonic oscillations generated by means of the test signals.

A first step for ascertaining the location of the minima uses the response signals S_Antw_2,3,4, which result from the test signals for generating harmonic oscillations having a common fixed predetermined excitation amplitude>>0, to ascertain the Fourier coefficients for the 0 and 1 order of the behavior of the response area for the associated excitation amplitude. The minimum and the maximum, preferably their response amplitude and phase position, of the sinusoidal curve of the response amplitudes are ascertained from the Fourier coefficients. This is preferably carried out for the range having excitation amplitudes>0. In a second step, the further property of the response area is used that the absolute value of the gradient of the response area in the negative and positive direction is approximately constant along increasing absolute values of the excitation amplitudes>>0 to be generated by means of the test signals. The associated slope for the range having excitation amplitudes>0 is ascertained, for example, from the level of the response amplitude of the response signal S_Antw_1, which results as a function of the first test signal, and the ascertained level of the maximum of the response amplitude of the sinusoidal curve, at the phase position of the ascertained maximum of the sinusoidal curve. The value or the level of the response signal or the response amplitude, which results from the first test signal for generating a harmonic oscillation at the predetermined excitation amplitude S_Test_1_A=0, is constant over the phase position from 0 to 360°, since the superposition of the first signal with a test signal for generating a harmonic oscillation at the predetermined excitation amplitude=0, independently of the phase position to be generated by means of the test signal, has no influence on the response amplitude generated by means of the first signal. With the aid of the slope thus ascertained and, for example, the minimum of the sinusoidal curve in the range of the excitation amplitudes<0 and the maximum of the sinusoidal curve in the range of the excitation amplitudes>0, 2 straight lines may be described. A first straight line G1 has the ascertained slope and goes at the phase position of the ascertained maximum of the sinusoidal curve through the point of the level of the response amplitude, which results from the first test signal, and through the point of the level of the maximum of the sinusoidal curve which results from the test signals for generating harmonic oscillations at a common fixed predetermined excitation amplitude>>0. A second straight line G2 has the negative ascertained slope-slope and goes at the phase position of the ascertained maximum of the sinusoidal curve through the point of the level of the minimum of the sinusoidal curve which results for the range having excitation amplitudes<0 of the response area. Two further straight lines G1' and G2' may preferably be constructed, the phase position of which is shifted 180° in relation to the straight lines G1 and G2, wherein G1' intersects the point of the ascertained level of the minimum of the response amplitude of the sinusoidal curve at the phase position of the ascertained minimum of the sinusoidal curve for the range having excitation amplitudes>0. The two straight lines G1 and G2 intersect in a first minimum, the position of which is described by means of the excitation amplitude and the phase position with respect to the response area. For the first minimum, a first minimum phase position and, as an excitation amplitude, a first (negative) minimum amplitude results. The two straight lines G1' and G2' intersect in a second minimum, the position of which is described by means of the excitation amplitude and the phase position with respect to the response area. For the second minimum, a second minimum phase position and, as the excitation amplitude, a second (positive) minimum amplitude results. The first minimum phase position is shifted 180° in relation to the second minimum phase position. The absolute value of the first minimum amplitude corresponds to the absolute value of the second minimum amplitude, wherein the sign of one minimum amplitude is negative and the sign of the other minimum amplitude is positive.

With the aid of the parameters thus ascertained of minimum amplitude and minimum phase position of the minima of the response area, on the one hand, parameters can be specified for a calibrated signal for generating a harmonic oscillation using the parameters minimum amplitude as the excitation amplitude and minimum phase position as the phase position, which results in a minimization of the mechanical oscillations upon a superposition with the first signal.

On the other hand, the unique response area can be constructed on the basis of the slope and minima ascertained from the response amplitudes of the test signals. Parameters for a harmonic oscillation to be generated by means of the calibrated signal can thus be read out and specified from the uniquely resulting response area, which, upon a superposition with the first signal, causes a corresponding response signal or response amplitude ascertained at a point of the response area or correspondingly causes a mechanical oscillation and thus a sound or a noise. Specifiable operating points are thus deliberately settable as a function of the response area, in that calibrated signals are specified to generate a harmonic oscillation having the parameters excitation amplitude and phase position of a corresponding point of the response area.

To determine a calibrated signal to generate a harmonic oscillation having the parameters excitation amplitude and phase position, the parameters for the excitation amplitude and phase position to be generated are specified as a function of one of the determined minima of the resulting response area. The parameters minimum amplitude and minimum phase position of this minimum are preferably taken over. Upon superposition of the first signal for generating the sinusoidal phase current and the preferred calibrated signal, the generated oscillation of the torque is minimal. Subsequently, the controller of the electric machine is operated using a superposition of the first signal and the calibrated signal to generate a sinusoidal phase current to energize a winding of the electric machine and to generate the harmonic oscillation.

A method is advantageously provided, using which a controller of an electric machine is calibrated by means of a previously defined number of harmonic excitations or test signals. From the correlation of the detected response signals, a specifiable optimum of the oscillations of the torque and/or the forces acting between rotor and stator is constructed, preferably by a forward calculation. The metrological (time) expenditure and the computing effort is known before the calibration and can be planned in accordingly, for example, for operating states having high external noise and thus masking of interfering noises for a driver of an electrically driven vehicle or an operator of a connected electric machine during the calibration. The repeated measurements, the detection of the different response signals, can run independently of one another over time and can thus be carried out with interruptions, since direct feedback is not used. The expected influence on the oscillations of the torque, forces between stator and rotor, and/or oscillations in the voltage curve of the DC side, from the previously defined number of harmonic excitations or test signals on the drive, can be estimated beforehand, so that, for example, operating points favorable for the method can be selected upon use in a vehicle. Oscillations in the drivetrain or vehicle electrical system oscillations during the method are preferably minimized. The method is preferably provided for an integrated electrical axle, consisting of the rotary field machine and a power electronics unit which is mechanically attached to the machine, preferably mechanically strongly or fixedly coupled, or integrated. The method enables the method to be carried out for each individual electric machine. It can thus be carried out both at the end of the production line and/or during the lifetime of the electrical drive as desired, also during a regular driving mode. A drive component (for example, an e-axle) preferably comprises the sensor and the method. An option is provided to have the method run during a startup, a check at the belt end, or in the driving mode. The calibration parameters can thus be determined and readjusted or relearned specifically by exemplar, as a function of temperature, and/or as a function of aging. A method is provided which provides a self-learning/self-calibrating controller for an electric drive. A self-calibration for a minimized oscillation of the torque is enabled, which runs independently of a test bench and external measurement sensors.

In another embodiment of the invention, the method comprises reading in an operating point of the electric machine, an inverter, and/or a battery and carrying out the method as a function of the detected operating point.

A method is provided which enables an operating point of the electric machine, an inverter, and/or a battery to be taken into consideration. Preferably, an operating point of a driven transmission or the drivetrain is taken into consideration. An operating point of the electric machine, the inverter, the battery, the driven transmission, or the drivetrain can be, for example, a requested torque, a speed, a current, a voltage, a temperature, or an age of the respective components. Specifiable test signals adapted to the operating point can be superimposed on the first signals as a function of the operating point.

A method is advantageously provided which enables an operating point of the electric machine to be taken into consideration.

Furthermore, the invention relates to a computer program which comprises commands which, upon execution by a computer, cause it to carry out the steps of the above-described method.

Furthermore, the invention relates to a computer-readable storage medium, comprising commands which, upon execution by a computer, cause it to carry out the steps of the above-described method.

Furthermore, the invention relates to a device for calibrating a controller of an electric machine. The device comprises a sensor, preferably a mechanical sensor. Furthermore, the device comprises a circuit carrier, wherein the circuit carrier has a test signal generator and a computing unit. The device is configured to carry out the steps of the described method.

Alternatively or additionally, a current or voltage meter can also be used, which is arranged, for example, on the DC voltage side of an inverter connected to the electric machine. This meter detects resulting oscillations in the current/voltage as the resulting response signal. The oscillations or voltage ripple can be reduced by means of the method.

A device for calibrating a controller of an electric machine is advantageously provided. This device comprises a sensor, preferably a mechanical sensor, for detecting the response signal resulting from the superposition of the first signal and the test signal. The device furthermore comprises a test signal generator for specifying the test signal and a computing unit for carrying out the described method.

In another embodiment of the invention, the sensor is connected mechanically fixedly or essentially rigidly to the electric machine. Alternatively, the sensor is fixedly attached to the circuit carrier and the circuit carrier is fixedly integrated on or in the electric machine.

For a high-resolution and undisturbed detection of the response signal, a connection to the electric machine which is mechanically fixed or via a circuit carrier, which is installed on or in the electric machine, is provided. Alternatively, of course, it can also be carried out using a sensor outside the device or power electronics unit, for example, a microphone at or adjacent to the electric machine or also by means of a structure-borne sound sensor, for example, embodied as an acceleration sensor installed on the surface, preferably of the electric machine or a control unit or inverter.

A position for fastening the sensor for a good signal transmission is advantageously provided.

In another embodiment of the invention, the mechanical sensor is a microphone, an acceleration sensor or a structure-borne sound sensor or a speed sensor, a torque sensor, or a torque measuring shaft.

Sensors are advantageously provided which are provided to detect the response signal which results from the oscillation of the torque or force oscillations between rotor and stator. The oscillations of the torque or the forces can be detected acoustically, by means of acceleration measurement, preferably on a mechanically fixed unit with the electric machine, or by means of structure-borne sound. A speed change of the electric machine also results from the oscillations of the torque, so that a detection of the response signals is also possible by means of a speed sensor.

Furthermore, the invention relates to an electric drive system having an electric machine and a described device. Such electric drive system is used, for example, to drive an electric vehicle. Optimized operation of the drivetrain is enabled by means of the method and the device.

Furthermore, the invention relates to a vehicle having a described drive system. A vehicle is thus advantageously provided which comprises a device using which a controller of an electric machine can be calibrated.

It is obvious that the features, properties, and advantages of the method according to the invention apply or are applicable accordingly to the device or the drive system and the vehicle and vice versa.

BRIEF DESCRIPTION OF THE DRAWINGS

Further features and advantages of embodiments of the invention result from the following description with reference to the appended drawings.

In the following, the invention is explained in more detail on the basis of several figures, in the figures.

DETAILED DESCRIPTION

Figure 1:
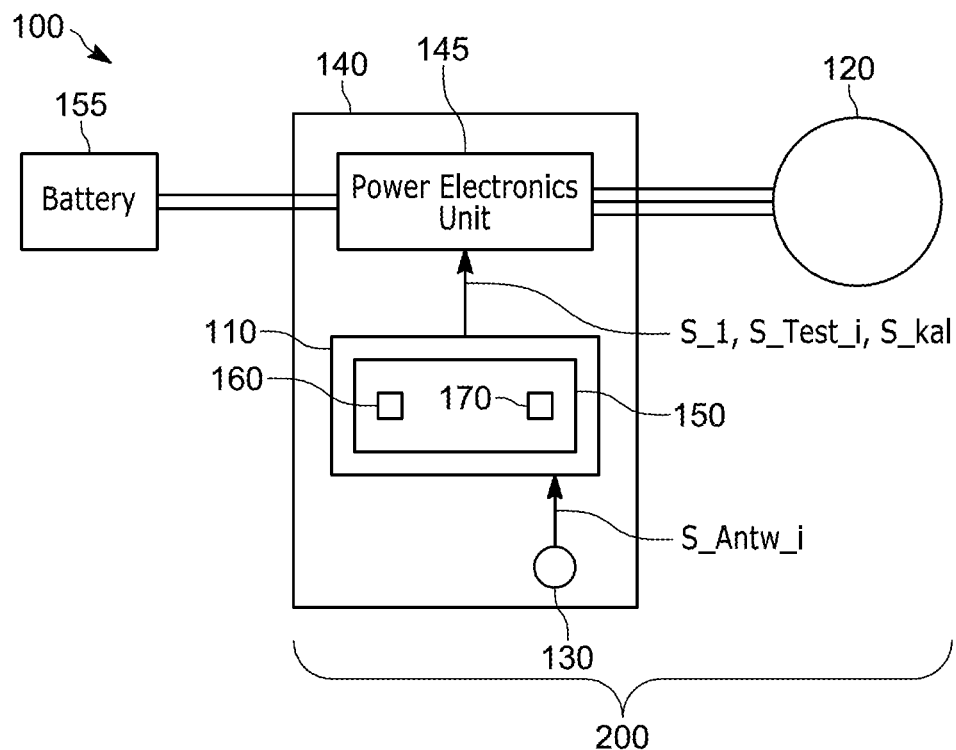
FIG. 1 shows a schematic representation of a device for calibrating a controller of an electric machine.

FIG. 1 shows a device 100 for calibrating a controller 110 of an electric machine 120. The device comprises a sensor 130, preferably a mechanical sensor, preferably having a mechanically rigid or fixed direct or indirect connection to the electric machine 120. Furthermore, the device comprises a circuit carrier 150, wherein the circuit carrier has a test signal generator 160 and a computing unit 170. The controller 110 is preferably integrated in an inverter 140, wherein the inverter comprises a power electronics unit 145, preferably a B6 bridge, for supplying the connectable machine 120 from a battery 155. Furthermore, the electrical drive system 200 having the device 100 and the electric machine 120 is shown in FIG. 1. The power electronics unit 145 of the inverter 140 is activated to calibrate the controller 110 of the electric machine 120 as a function of the first test signal $S\_1$ and a plurality of test signals $S\_Test\_i$. The response signals $S\_Antw\_i$ are detected by means of the sensor 130. After determination of the calibrated signal $S\_kal$, the power electronics unit 145 of the inverter 140 is activated to operate the controller 110 of the electric machine 120 as a function of the first test signal $S\_1$ and the calibrated signal $S\_kal$.

Figure 2:
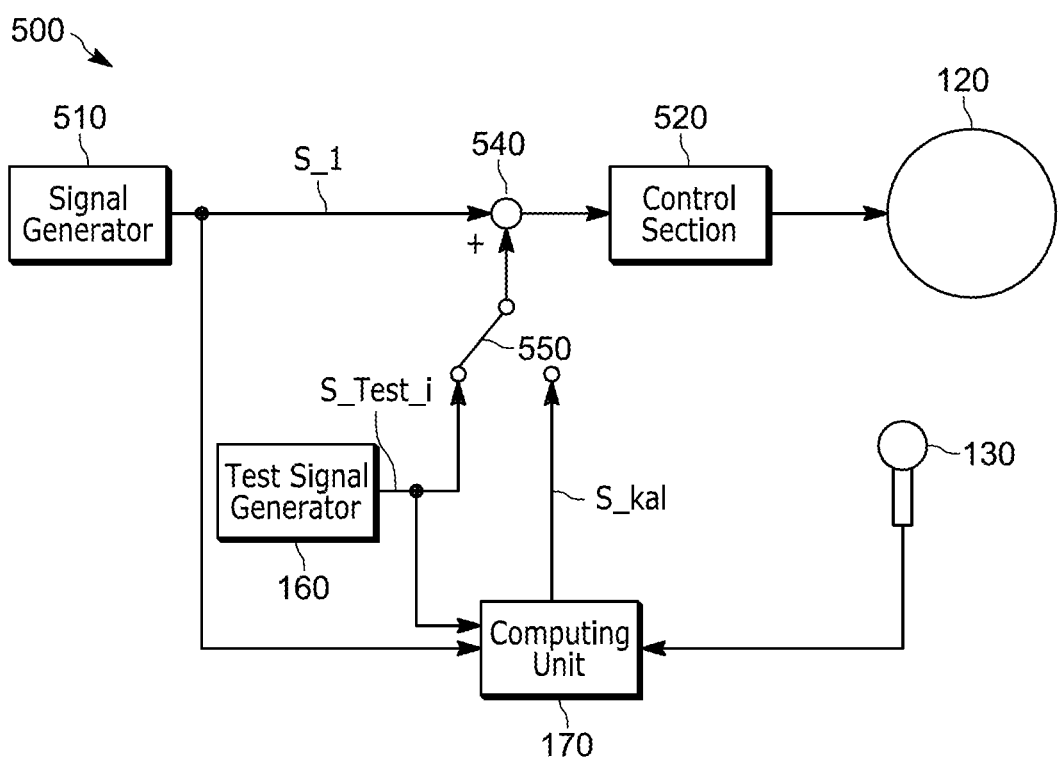
FIG. 2 shows a schematic control structure of the method for calibrating a controller of an electric machine.

FIG. 2 shows a schematic control structure 500 of the method for calibrating a controller 110 of an electric machine 120. A signal generator 510 outputs a first signal $S\_1$. This first signal $S\_1$ is superimposed by means of an adding unit 540 with a test signal $S\_Test\_i$ of the test signal generator 160 for the calibration of the controller 110 of the electric machine 120. The electric machine 120 is activated via a control section 520 as a function of the superimposed signals. This generates a torque, which has oscillations.

These are detected by means of a sensor 130 and passed on as response signals S_Antw_i to a computing unit 170 for evaluation. The computing unit 170 also receives the first signal S_1 and the test signals S_Test_i for evaluation. The evaluation comprises the ascertainment of a minimum of a resulting response area A_Antw from the resulting response signals S_Antw_i of the harmonic oscillations generated by means of the test signals S_Test_i. The computing unit 170 ascertains a minimum of the response area A_Antw and determines, as a function of the parameters of the minimum, a calibrated signal S_kal for generating a harmonic oscillation having a predetermined excitation amplitude and a phase position relative to the phase current. The calibrated signal is selected via a switch 550 and superimposed by means of the adding unit 540 with the first signal S_1 for the regular operation of the controller 110 of the electric machine 120. The test signal S_Test_i or calibrated signal S_kal used for the superposition can be selected via the switch 550, depending on whether the controller 110 is being calibrated or is being operated in a regular manner to operate the electric machine 120.

Figure 3:
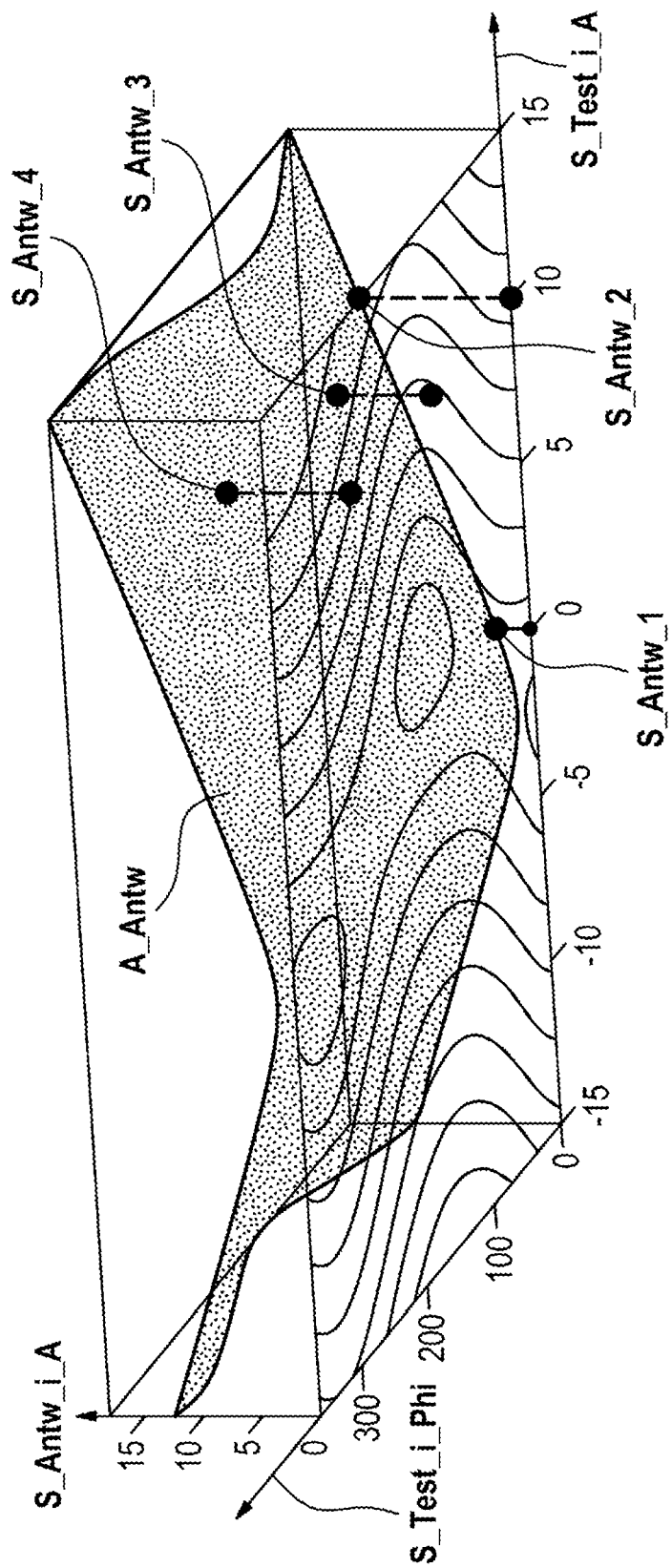
FIG. 3 shows a schematic response area of resulting response signals.

FIG. 3 shows a schematic response area A_Antw, which results from the resulting response signals S_Antw_i of the harmonic oscillations generated by means of the test signals S_Test_i. In the z direction, the dimension of the response amplitudes S_Antw_i_A of the resulting response signals S_Antw_i is plotted. In the y direction, the phase position S_Test_i_Phi of the harmonic oscillation to be generated using the test signal S_Test_i is plotted. In the x direction, the dimension of the excitation amplitudes S_Test_i_A of the harmonic oscillation to be generated using the test signal S_Test_i is plotted. The four positions of the harmonic oscillations generated by means of the test signals are shown corresponding to phase positions, excitation amplitudes, and response signals by way of example, from which the response area A_Antw results, as described above. The response area is preferably ascertained via specifiable ranges of the phase position, for example, 0 to 360°, and the excitation amplitude, for example, from −15 to +15, as a function of the ascertained minima. Furthermore, the ascertained minima of the response area, as described above, are recognizable by means of the height lines and the curve of the response area in FIG. 3. As a function of at least one minimum phase position and at least one minimum amplitude, the parameters excitation amplitude and phase position of the harmonic oscillation to be generated by means of the calibrated signal are determined and specified.

Figure 4:
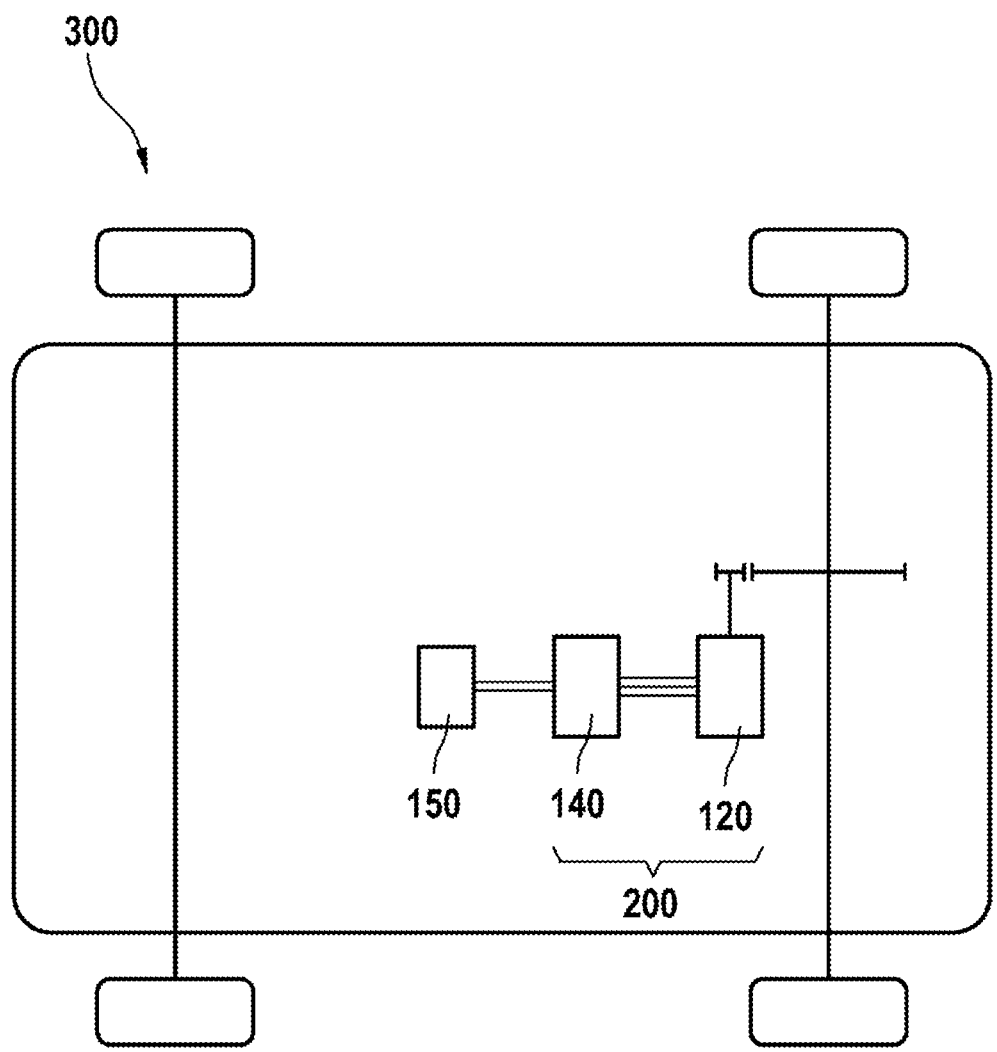
FIG. 4 shows a schematically illustrated vehicle having a drivetrain.

FIG. 4 shows a schematically illustrated vehicle 300 having an electric drive system 200. The drive system 200 comprises the device 100 for calibrating the controller 110 of the electric machine 120 in the inverter 140 and the electric machine 210. The electric drive system preferably comprises the battery 150.

Figure 5:
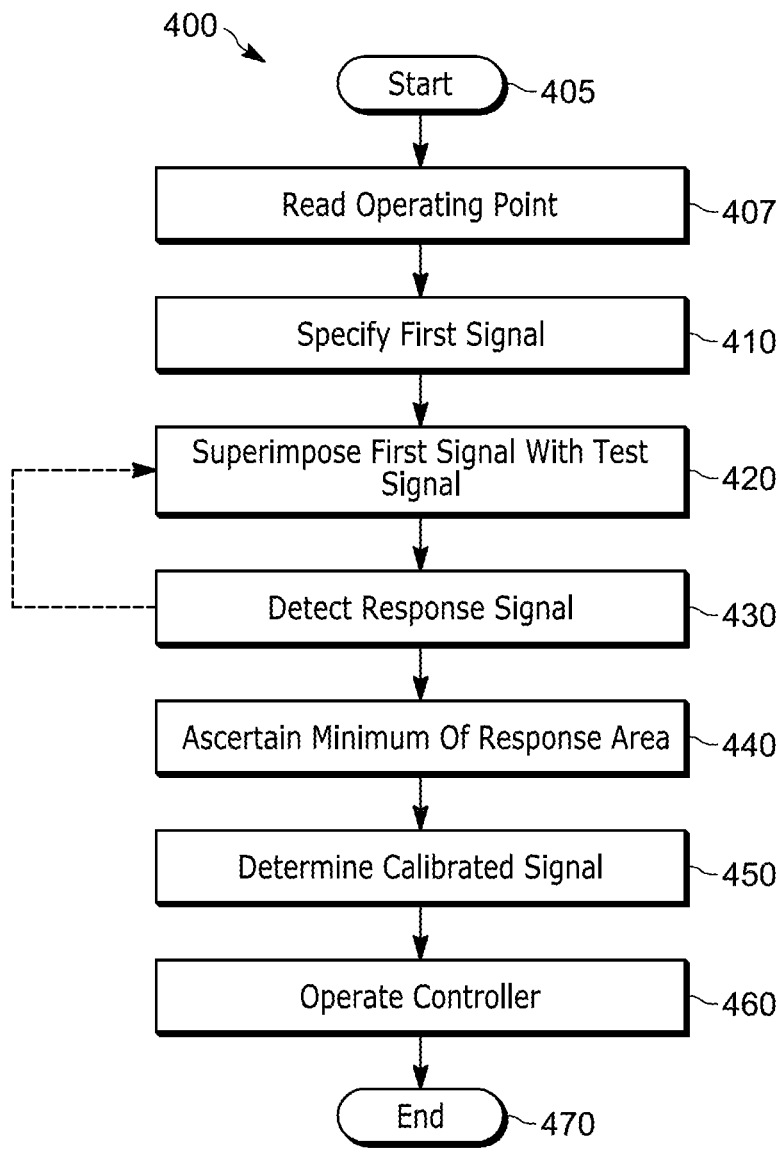
FIG. 5 shows a schematically illustrated flow chart for a method for calibrating a controller of an electric machine.

FIG. 5 shows a schematic sequence of a method 400 for calibrating a controller of an electric machine 120. The method starts with step 405. Preferably, this is followed by reading in 407 an operating point of the electric machine 120, an inverter 140, and/or the battery 150 and carrying out the method as a function of the detected operating point.

The further method 400 comprises the following steps:
Specifying 410 a first signal S_1 for generating a sinusoidal phase current to energize a winding of an electric machine 120,
superimposing 420 the first signal S_1 with a test signal S_Test_i to generate at least one harmonic oscillation, preferably an overtone of a specifiable order, having a predetermined excitation amplitude and/or phase position relative to the phase current, which is superimposed on the phase current,
detecting 430 a response signal S_Antw_i resulting from the superposition of the phase current and the harmonic oscillation by means of a sensor 130;
repeating the two preceding steps "superimposing" 420 and "detecting" 430 multiple times using different test signals S_Test_i to generate further harmonic oscillations having specifiable and/or differing excitation amplitudes and/or phase positions relative to the phase current, which are superimposed on the phase current,
ascertaining 440 a minimum of a resulting multiply curved response area A_Antw from the resulting response signals S_Antw_i of the harmonic oscillations generated by means of the test signals S_Test_i,
determining 450 a calibrated signal S_kal to generate a harmonic oscillation having a predetermined excitation amplitude and a phase position relative to the phase current as a function of the ascertained minimum of the response area A_Antw, preferably for which a response signal having minimal response amplitude results,
operating 460 the controller 110 of the electric machine 120; wherein the first signal S_1 for generating a sinusoidal phase current is specified to energize a winding of the electric machine 120 and the calibrated signal S_kal is superimposed to generate a harmonic oscillation having a predetermined excitation amplitude and a phase position relative to the phase current. The method ends with step 470.

The invention claimed is:

1. A method (400) for calibrating a controller (110) of an electric machine (120), the method comprising the following steps:
   specifying (410) a first signal (S_1) for generating a sinusoidal phase current to energize a winding of an electric machine (120),
   superimposing (420) the first signal (S_1) with a test signal (S_Test_i) to generate at least one harmonic oscillation, having a predetermined (i) excitation amplitude, (ii) phase position, or both (i) and (ii) relative to the phase current, which is superimposed on the phase current,
   detecting (430) a response signal (S_Antw_i) resulting from the superposition of the phase current and the harmonic oscillation by means of a sensor (130);
   repeating the two preceding steps "superimposing" (420) and "detecting" (430) multiple times using different test signals (S_Test_i) to generate further harmonic oscillations having specifiable excitation amplitudes and/or phase positions relative to the phase current, which are superimposed on the phase current,
   ascertaining (440) a minimum of a multiply curved response area (A_Antw), which results as a function of the resulting response signals (S_Antw_i) of the harmonic oscillations generated by means of the test signals (S_Test_i),
   determining (450) a calibrated signal (S_kal) to generate a harmonic oscillation having a predetermined excitation amplitude and a phase position relative to the phase current as a function of the ascertained minimum,
   operating (460) the controller (110) of the electric machine (120); wherein the first signal (S_1) for generating a sinusoidal phase current is specified to energize a winding of the electric machine (120) and the determined calibrated signal (S_kal) is superimposed to generate the harmonic oscillation.

2. The method (400) as claimed in claim 1, having the following further steps:
reading in (407) an operating point of the electric machine (120), an inverter (140), the battery (150), or a combination of the same and
carrying out the method as a function of the detected operating point.

3. A non-transitory, computer-readable medium, comprising commands which, upon the execution by a computer, cause the computer to calibrate a controller (110) of an electric machine (120), by:
specifying (410) a first signal (S_1) for generating a sinusoidal phase current to energize a winding of an electric machine (120),
superimposing (420) the first signal (S_1) with a test signal (S_Test_i) to generate at least one harmonic oscillation, having a predetermined (i) excitation amplitude, (ii) phase position, or both (i) and (ii) relative to the phase current, which is superimposed on the phase current,
detecting (430) a response signal (S_Antw_i) resulting from the superposition of the phase current and the harmonic oscillation by means of a sensor (130);
repeating the two preceding steps "superimposing" (420) and "detecting" (430) multiple times using different test signals (S_Test_i) to generate further harmonic oscillations having specifiable excitation amplitudes and/or phase positions relative to the phase current, which are superimposed on the phase current,
ascertaining (440) a minimum of a multiply curved response area (A_Antw), which results as a function of the resulting response signals (S_Antw_i) of the harmonic oscillations generated by means of the test signals (S_Test_i),
determining (450) a calibrated signal (S_kal) to generate a harmonic oscillation having a predetermined excitation amplitude and a phase position relative to the phase current as a function of the ascertained minimum,
operating (460) the controller (110) of the electric machine (120); wherein the first signal (S_1) for generating a sinusoidal phase current is specified to energize a winding of the electric machine (120) and the determined calibrated signal (S_kal) is superimposed to generate the harmonic oscillation.

4. A device (100) for calibrating a controller (110) of an electric machine (120), the device comprising:
a sensor (130), and
a circuit carrier (150),
wherein the circuit carrier has a test signal generator (160) and a computing unit (170),
wherein the device is configured to
specify (410) a first signal (S_1) for generating a sinusoidal phase current to energize a winding of an electric machine (120),
superimpose (420) the first signal (S_1) with a test signal (S_Test_i) to generate at least one harmonic oscillation, having a predetermined (i) excitation amplitude, (ii) phase position, or both (i) and (ii) relative to the phase current, which is superimposed on the phase current,
detect (430) a response signal (S_Antw_i) resulting from the superposition of the phase current and the harmonic oscillation by means of a sensor (130);
repeat the two preceding steps "superimposing" (420) and "detecting" (430) multiple times using different test signals (S_Test_i) to generate further harmonic oscillations having specifiable excitation amplitudes and/or phase positions relative to the phase current, which are superimposed on the phase current,
ascertain (440) a minimum of a multiply curved response area (A_Antw), which results as a function of the resulting response signals (S_Antw_i) of the harmonic oscillations generated by means of the test signals (S_Test_i),
determine (450) a calibrated signal (S_kal) to generate a harmonic oscillation having a predetermined excitation amplitude and a phase position relative to the phase current as a function of the ascertained minimum,
operate (460) the controller (110) of the electric machine (120); wherein the first signal (S_1) for generating a sinusoidal phase current is specified to energize a winding of the electric machine (120) and the determined calibrated signal (S_kal) is superimposed to generate the harmonic oscillation.

5. The device (100) as claimed in claim 4,
wherein the sensor (130) is mechanically fixedly connected to the electric machine (120) or the sensor (130) is fixedly attached to the circuit carrier (150) and the circuit carrier (150) is fixedly integrated on or in the electric machine (120).

6. The device (100) as claimed in claim 5, wherein the sensor (130) is a microphone, an acceleration sensor or a structure-borne sound sensor or a speed sensor.

7. An electric drive system (200) having an electric machine (120) and a device (100) comprising:
a sensor (130), and
a circuit carrier (150),
wherein the circuit carrier has a test signal generator (160) and a computing unit (170),
wherein the device is configured to
specify (410) a first signal (S_1) for generating a sinusoidal phase current to energize a winding of the electric machine (120),
superimpose (420) the first signal (S_1) with a test signal (S_Test_i) to generate at least one harmonic oscillation, having a predetermined (i) excitation amplitude, (ii) phase position, or both (i) and (ii) relative to the phase current, which is superimposed on the phase current,
detect (430) a response signal (S_Antw_i) resulting from the superposition of the phase current and the harmonic oscillation by means of a sensor (130);
repeat the two preceding steps "superimposing" (420) and "detecting" (430) multiple times using different test signals (S_Test_i) to generate further harmonic oscillations having specifiable excitation amplitudes and/or phase positions relative to the phase current, which are superimposed on the phase current,
ascertain (440) a minimum of a multiply curved response area (A_Antw), which results as a function of the resulting response signals (S_Antw_i) of the harmonic oscillations generated by means of the test signals (S_Test_i),
determine (450) a calibrated signal (S_kal) to generate a harmonic oscillation having a predetermined excitation amplitude and a phase position relative to the phase current as a function of the ascertained minimum,
operate (460) a controller (110) of the electric machine (120); wherein the first signal (S_1) for generating a sinusoidal phase current is specified to energize a winding of the electric machine (120) and the determined calibrated signal (S_kal) is superimposed to generate the harmonic oscillation.

* * * * *